United States Patent [19]

Waller

[11] Patent Number: 5,007,768

[45] Date of Patent: Apr. 16, 1991

[54] ANCHORING STRUCTURE FOR UNDERGROUND PIPES

[76] Inventor: George W. Waller, Rte. 13, 190 Strickland Rd., Alpharetta, Ga. 30201

[21] Appl. No.: 510,181

[22] Filed: Apr. 17, 1990

[51] Int. Cl.$^5$ .............................................. F16L 3/00
[52] U.S. Cl. ..................................... 405/154; 248/49; 405/172
[58] Field of Search ............... 405/154, 172, 156, 157; 248/49; 52/153, 155, 157, 159

[56] References Cited

U.S. PATENT DOCUMENTS

| | | | |
|---|---|---|---|
| 3,568,455 | 3/1971 | McLaughlin et al. | 405/154 |
| 3,797,260 | 3/1974 | Webb | 405/172 |
| 4,043,139 | 8/1977 | Scott | 405/154 |
| 4,090,686 | 5/1978 | Yarbrough | 405/154 X |
| 4,126,012 | 11/1978 | Waller | 405/157 |
| 4,492,493 | 1/1985 | Webb | 405/172 |
| 4,826,111 | 5/1989 | Ismert | 405/172 X |

*Primary Examiner*—Dennis L. Taylor
*Attorney, Agent, or Firm*—Nies, Kurz, Bergert & Tamburro

[57] ABSTRACT

A pipe anchoring structure adapted to firmly and securely support a pipe relative to undisturbed earth. The device includes a stake body portion adapted to be driven into the ground. The stake body portion carries a pair of adjustable clamping members adapted to engage opposed surfaces of a pipe. Each of the clamping members can be firmly secured to the stake body portion when the pipe has been aligned and positioned in a desired orientation. Additionally, each of the clamping members includes a plurality of concentric circular arc cutout portions to define a recess in one end thereof, the opposed recesses of the respective clamping members adapted to be positioned on opposite sides of a pipe. Laterally outer portions of the clamping members are held against relative rotation by an outboard support rod that passes through each of the clamping members and that includes a head end at one end and a plurality of axially spaced circumferential grooves to receive a circlip in an appropriate groove to limit movement of the support rod relative to the clamping members. Preferably, the elements of the invention are made from plastic material for convenience, low cost, and light weight, and the clamping members portions can be secured to the stake body portion mechanically, such as by connecting screws, and also by means of adhesive connections, such as solvent sealing or gluing.

10 Claims, 7 Drawing Sheets

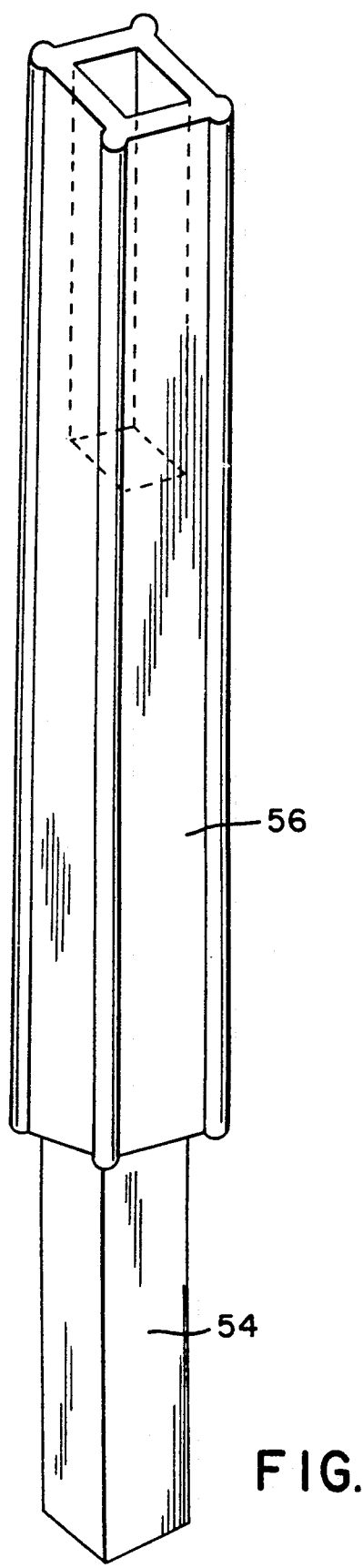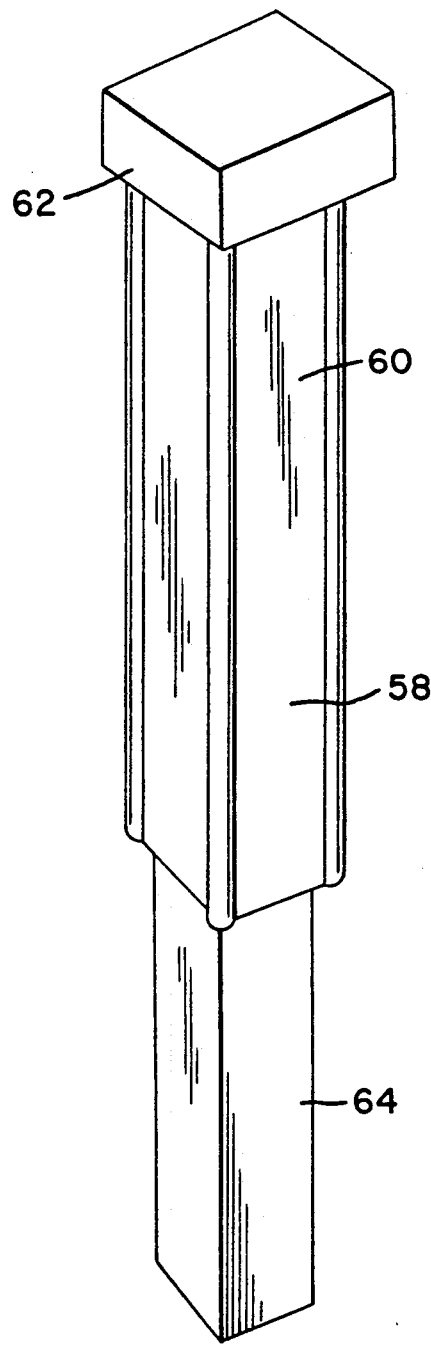
FIG. 3
FIG. 4

ANCHORING STRUCTURE FOR UNDERGROUND PIPES

BACKGROUND OF THE INVENTION

1. Field of the Invention

The present invention relates to apparatus for firmly supporting against upward or downward movement an underground pipe that has been set in a trench and covered with fill dirt. More particularly, the present invention relates to underground pipe support apparatus in the form of an underground stake that includes a pair of clamping members that clampingly engage the outer surface of an underground pipe, the clamping members being securely fastened to the stake to firmly grip and hold the pipe in its original position, relative to the bottom of the trench, so that it does not float to the surface as a result of freezing, thawing, and other movement of the softer fill dirt.

2. Description of the Related Art

The use of stake-type supports for supporting a pipe in a trench has been practiced for some time. In applicant's U.S. Pat. No. 4,126,012, which issued Nov. 21, 1978, there is disclosed an underground pipe hanger that includes a stake portion that is driven into the solid, unexcavated ground below the base of a trench. The stake portion carries a pair of laterally extending arms that are integrally formed with the stake to support a pipe of predetermined diameter. Thus, a number of such hangers must be available with different lateral arm spacings to accommodate pipes of different diameters. Additionally, a variation of applicant's earlier invention incorporating a ring that is carried on a slidable sleeve is also limited to a specific pipe size, thereby requiring a large number of different size ring structures in order to accommodate the wide variety of pipe sizes in normal use.

A form of underground pipe hanger or support that is capable of accommodating pipes of different diameters is disclosed in R.E. McLaughlin et al. U.S. Pat. No. 3,568,455, which issued Mar. 9, 1971. The McLaughlin device includes a steel spike that slidably carries a bracket plate having a cutout portion to receive a pipe. A flexible cable is attached to the bracket plate and is adapted to be passed around the pipe. One end of the flexible cable is firmly secured to the bracket plate and the other end includes a closed loop that is placed in one of a number of notches formed in the bracket to accommodate a variety of pipe sizes. However, the cutout in the McLaughlin et al. bracket is sized for a specific pipe, and thus pipes of sizes different from that of the bracket cutout have localized outer surface stress points because of the small surface area of contact between the pipe and the bracket. Such stress points are particularly undesirable when plastic pipe is supported by the device. Additionally, the McLaughlin et al. bracket is merely held in position relative to the stake by means of a setscrew, which could later permit relative movement between the bracket and the stake, thereby defeating the purpose of the device.

It is an object of the present invention to overcome the shortcomings of the prior art devices described above.

It is a further object of the present invention to provide an improved underground pipe hanger structure that securely grips and engages a substantial circumferential surface area of a pipe, and that is securely carried by an underground stake.

It is an additional object of the present invention to provide an underground pipe hanger made from plastic for light weight, ease of fabrication, and lower cost.

SUMMARY OF THE INVENTION

Briefly stated, in accordance with one aspect of the present invention, a pipe anchor is provided for permanently anchoring different diameter pipes either on, above, or under the ground. The anchor includes a stake portion having a noncircular cross-section and including laterally extending wing members to prevent rotation of the stake when it is installed in the ground. First and second clamping members are secured to the stake portion, each of the clamping members including a plurality of circular arc portions provided in opposed surfaces to firmly and securely accommodate pipes having different outer diameters. The clamping members are slidable along the stake portion for field adjustment of the height an slope of the pipe, and attachment means re provided for firmly and permanently securing the clamping members in position relative to the stake to prevent unintended movement of the clamping member relative to the stake after the stake has been permanently installed.

BRIEF DESCRIPTION OF THE DRAWINGS

FIG. 3 is a front perspective view of one form of stake extension member that can be used in conjunction with the present invention.

FIG. 4 is a front perspective view of a driving device for driving into the ground a stake portion in accordance with the present invention.

DESCRIPTION OF THE PREFERRED EMBODIMENTS

Figure 1:
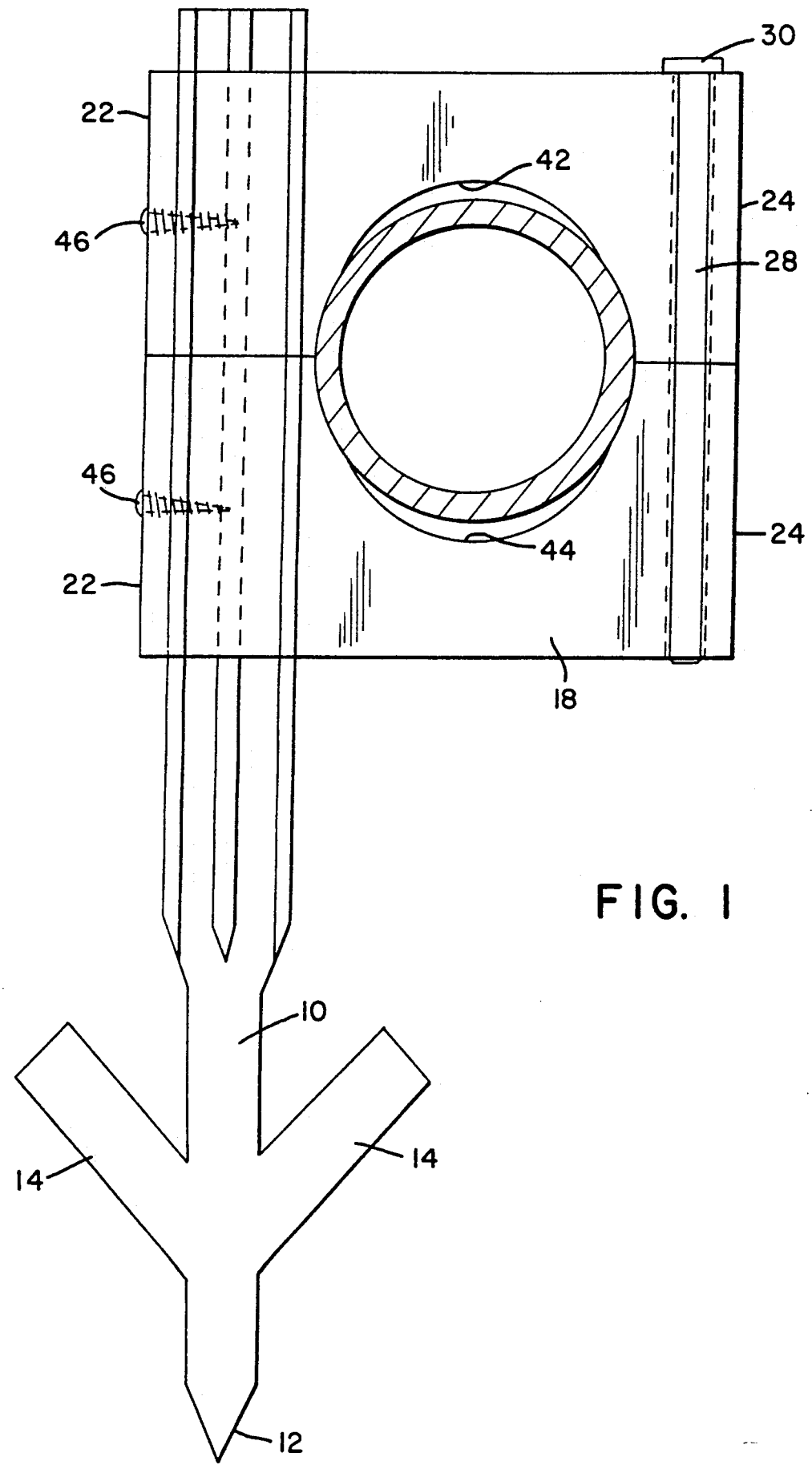
FIG. 1 is an elevational view of an anchoring stake and pipe clamping members in accordance with the present invention, showing the various parts thereof in their final, assembled relationship and supporting a pipe.

Referring now to the drawings, and particularly to FIG. 1 thereof, there is shown an elongated stake body portion 10 that has a pointed end 12 to facilitate driving body portion 10 into the ground. Adjacent to and spaced from pointed end 12 are a pair of laterally outwardly extending arms or wing members 14 to prevent rotation and removal of the stake after it has been driven into the ground to a depth at which the wing members 14 are below ground level and in firm, undisturbed dirt.

A pair of clamping members in the form of upper clamping member 16 and lower clamping member 18 are slidably carried on stake body portion 10. Each of clamping members 16 and 18 is in the form of a substantially rectangular block that includes a throughbore 20 (see FIG. 5) adjacent one side edge 22, throughbore 20 being of a size sufficient to permit stake body portion 10 to freely pass therethrough. Spaced from throughbores 20 and adjacent an opposite side edge 24 are support rod throughbores 26 that are adapted to slidably receive an outboard support rod 28, which can be of any convenient cross section. Support rod 28 preferably includes a head 30 to limit axial movement of support rod 28 in one direction, and a plurality of circumferential grooves 32 formed adjacent the opposite end 34 of the support rod to receive a circlip 36 to limit axial movement of support rod 28 in the opposite direction after the device has been assembled.

Clamping members 16 and 18 each include opposed sides 38, 40, respectively, in which arcuate recesses 42, 44 are formed to accommodate therebetween a pipe having a circular cross section. As shown in FIG. 1, and as will be explained in more detail hereinafter, arcuate recesses 42, 44 preferably are so configured that they can accommodate pipes of different outer diameters and to support such pipes over a substantial portion of the outer periphery thereof in order to minimize stress concentrations caused by point or line contact, rather than surface contact, between each of clamping members 16, 18 and the pipe outer surface.

Also as shown in FIG. 1, each of upper and lower clamping members 16, 18, respectively, is securely fastened to stake body portion 10 by means of connecting screws 46 that are threadedly received in stake body portion 10 to prevent unintended axial movement of clamping members 16 and 18 after they have been set in their final positions while supporting a pipe therebetween.

Figure 2:
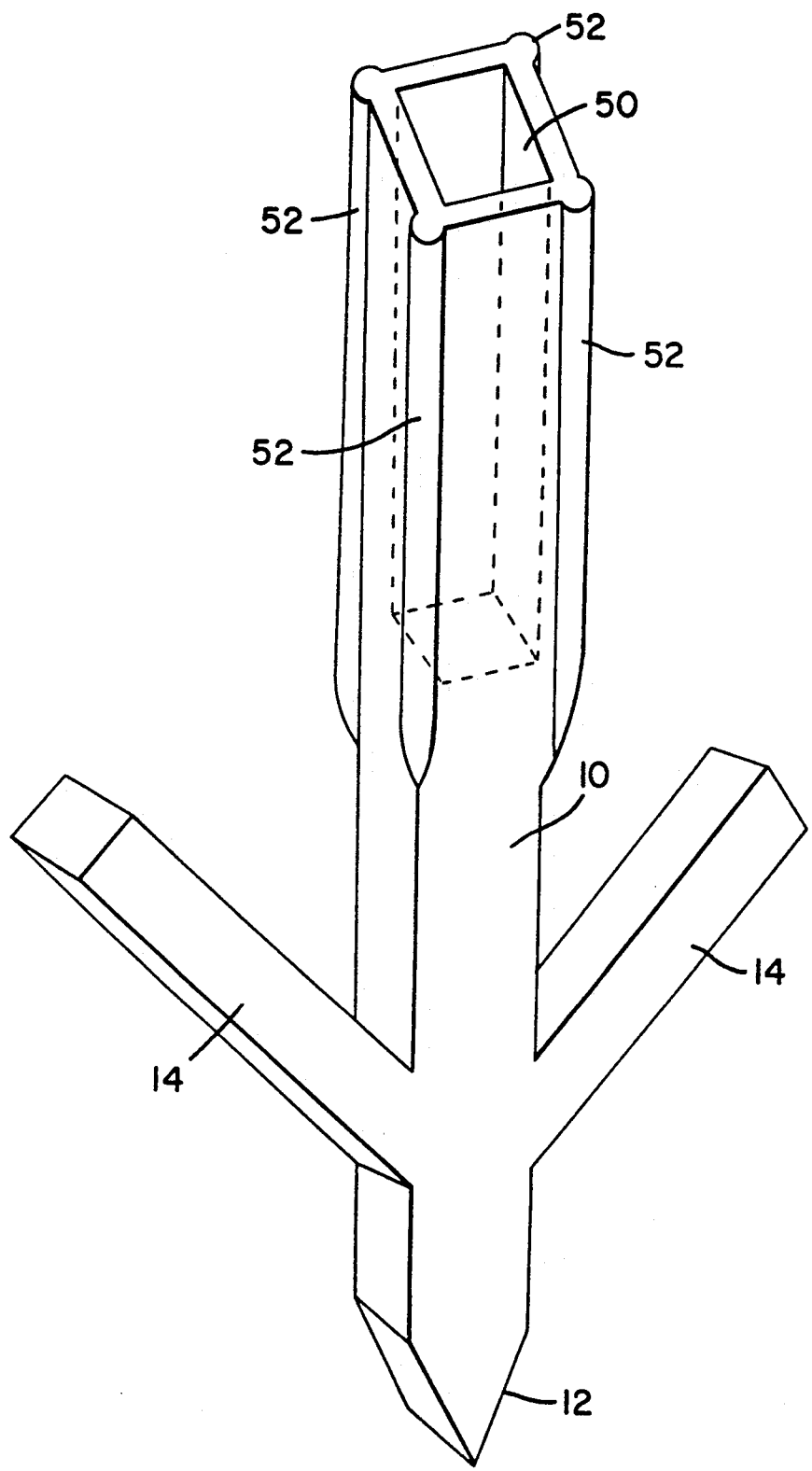
FIG. 2 is a front perspective view of one form of stake portion that can be used in connection with the present invention.

Stake body portion 10 is shown in front perspective in FIG. 2, which also shows the preferred rectangular cross-sectional form for the stake body portion. As shown, stake body portion 10 includes an inner, coaxial recess 50 at its upper end. Recess 50 is also of rectangular cross section and is coaxial with the axis of the body portion so that the respective walls between the recess and the stake body portion are of substantially uniform thickness. Additionally, as also shown in FIG. 2, the outer, longitudinally extending edges of stake body portion 10 can include rounded projections 52 to increase surface contact with throughbores 20 in clamping members 16 and 18, to thereby increase the contacting surface areas after installation of the clamping members on the stake body portion.

Recess 50 in the end of stake body portion 10 is adapted to receive an end 54 of an extension member 56, which is shown in FIG. 3 and which preferably has the same size and cross-section as the corresponding body and end of stake body portion 10. Extension member 56 has an axial length sufficient to receive and to permit proper positioning of clamping members 16, 18 when stake body portion 10 is driven into solid ground, so that the main body of extension member 56 passes completely through respective throughbores 20 in each of clamping members 16 and 18. Various lengths of extension members can be provided depending upon the particular needs in a specific installation, and, if necessary, successive extension members having similar recesses and corresponding ends can be arranged to be connected together to form a longer stake.

Stake body portion 10 is initially driven into the solid, unexcavated dirt at the base of a trench. One way to conveniently drive body portion 10 into the ground without damaging the uppermost end thereof is by means of a stake driver 58 having a configuration as illustrated in FIG. 4. Driver 58 has a structure similar to that of extension 56 and includes a body 60 that terminates in a top surface 62 adapted to receive the driving blows for driving the stake portion into the ground. Extending from the opposite end of driver body 60 is a rectangular pilot end 64 that is adapted to be slidably received in recess 50 formed in stake body portion 10. Preferably, driver body 60 has a greater cross-sectional area than that of pilot end 64, to define an outwardly extending shoulder that is engagable with the outer rectangular end of stake body portion 10 to distribute the driving impact forces over the entire cross-sectional area of the end of stake body portion 10, and thereby avoid possible damage to that end that could result from direct hammer blows.

Figure 5:
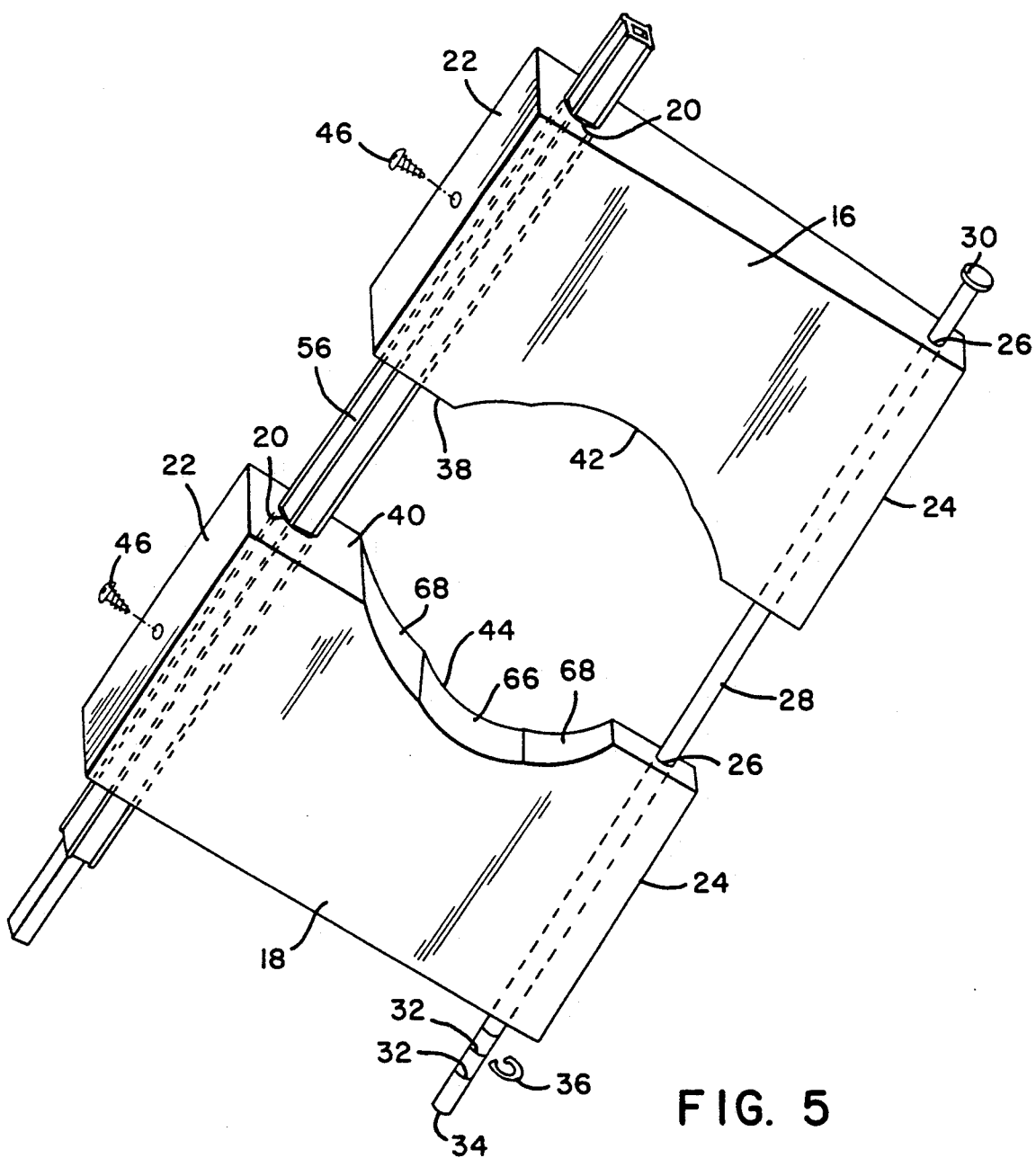
FIG. 5 is a perspective view of a stake extension and two pipe clamping members before being secured in position.

A preferred form for clamping members 16, 18 of the present invention is shown in FIG. 5, wherein clamping members 16, 18 are shown in spaced position along a stake extension 56, and include an outboard support rod 28 to prevent relative rotation between the upper and lower clamping members. Connecting screws 46 for connecting each of the clamping members to stake body 10 or to extension 56, and circlip 36 for defining a stop surface on support rod 28 are shown spaced from their respective connection points, for purposes of clarity. As is also apparent from FIG. 5, throughbores 20 in the respective clamping members 16, 18 can be circular bores, as shown. Alternatively, if desired, throughbores 20 can be of rectangular or any other convenient cross section consistent with the cross section of the body portion or extension to which the clamping members are to be connected.

Each of clamping members 16 and 18 preferably includes pipe-engaging clamping surfaces that are able to provide surface contact between the clamp surface and the pipe, to minimize localized surface stresses in the pipe. As shown in FIG. 5, clamping surface 44 includes two pipe-engaging arc sections, a central pipe-engaging section 66 for a small diameter pipe, and a pair of outer pipe-engaging sections 68 for a larger diameter pipe. Preferably the center of arc section 66 and the center of arc sections 68 are coincident.

Figure 6:
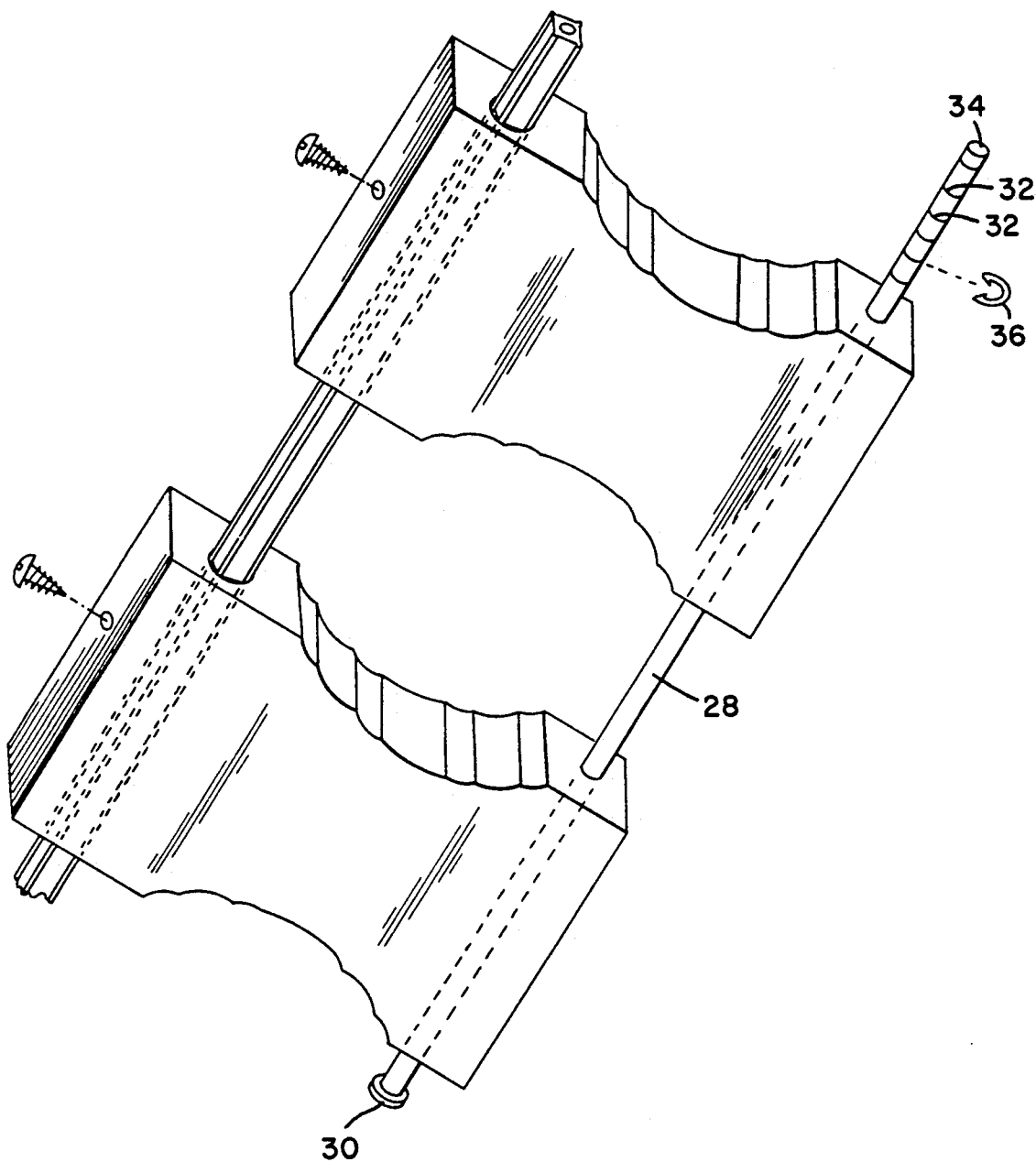
FIG. 6 is a view similar to FIG. 5, showing pipe clamping members having jaw surfaces formed on both upper and lower ends of each of the clamping members.

A further embodiment of clamping members 16, 18 is shown in FIG. 6, wherein the clamping members each have clamping surfaces that include four concentric circular arcs formed in opposed end surfaces, to receive one of four different diameter pipes. Additionally, each clamping member also has a series of different diameter concentric circular arcs formed in each of their respective outwardly facing end surfaces. Thus, the clamping members shown in FIG. 6 can accommodate one of eight different diameter pipes. Preferably, the radii of the four arc sections on one end of a clamping member are different from the radii of the four arc sections on the opposite end of the clamping member. For example, one end surface of a clamping member can be adapted to receive pipes having diameters of one and one-half, two, three, or four inches, whereas the opposite end surface of the clamping member can be adapted to receive pipes having outer diameters of five, six, eight, or nine inches.

Figure 7:
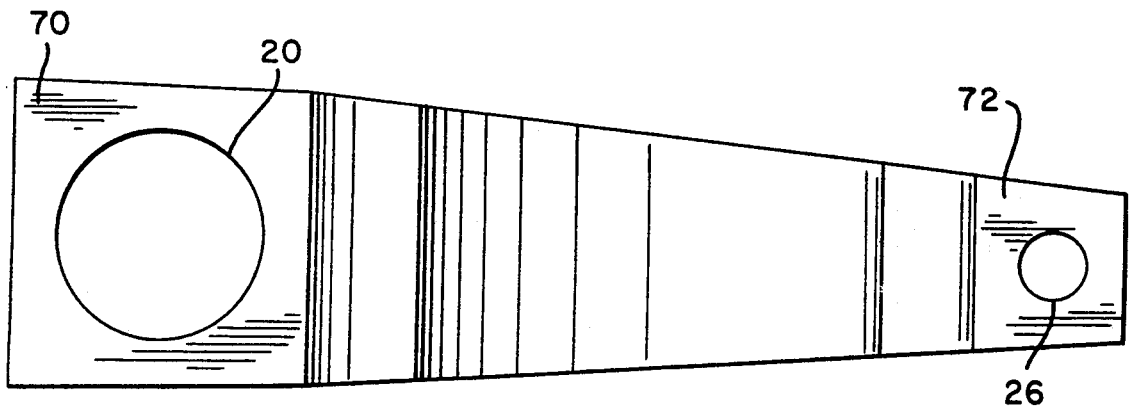
FIG. 7 is a top view of one form of pipe clamping member.

For ease of manufacture, the respective upper and lower clamping members can have a rectangular cross-section, but other cross-sections can be provided to minimize the amount of material and thereby lower the cost. For example, as shown in FIG. 7, the clamping member has a tapered cross-section, tapering from a wide end 70 that includes throughbore 20 adapted to receive a stake portion 10 or extension 56, to a narrower end 72 having passageway 26 to receive an outboard support rod (not shown).

Figure 8:
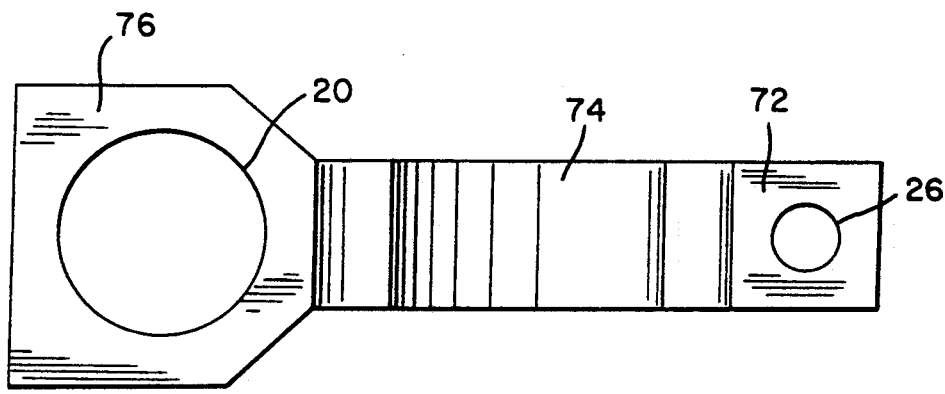
FIG. 8 is a top view of another form of pipe clamping member.

Alternatively, clamping members 16, 18 can have a cross section such as is illustrated in FIG. 8, where the intermediate portion 74 of the clamping member between the respective outer ends is defined by parallel outer faces, and the end 76 through which throughbore 20 passes is enlarged.

Figures 9, 10:
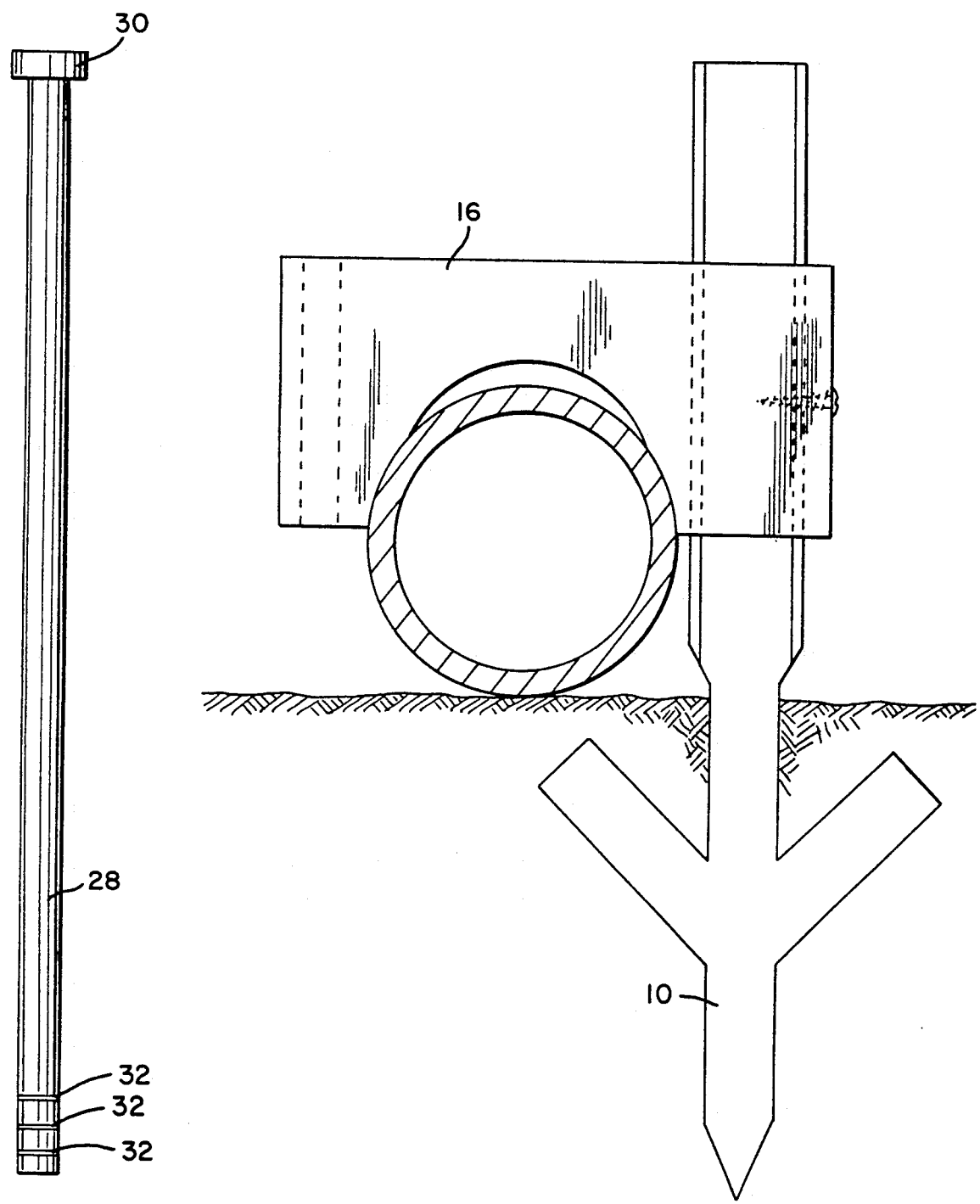
FIG. 9 is a side elevational view of an outboard support rod for preventing relative lateral movement between a pair of pipe clamping members in accordance with the present invention.
FIG. 10 is a front elevational view showing the use of elements of the present invention for holding a pipe in position on the surface of the ground.

Outboard support rod 28 is shown in FIG. 9 and preferably has an elongated body portion of uniform cross section terminating at one end in an enlarged head 30 that serves as a stop to limit movement of the support rod in one direction. The opposite end of the support rod includes a series of axially spaced, circumferential grooves 32 adapted to receive a suitably sized circlip (see FIGS. 5 and 6) to serve as a second stop to retain support rod 28 in position by limiting movement of the support rod after the device has been assembled.

In addition to the applicability of the present invention for supporting underground pipes, the elements of the present invention can also be utilized to support a pipe on the surface of the ground, as illustrated in FIG. 10. Since the ground serves as one clamp member, only a unitary clamping member 16 is needed in that particular application of the invention. Further, an outboard support rod is also not needed.

The various parts of the present invention are preferably formed from a plastic material in order to provide light weight and lower cost. Suitable plastic materials that can be utilized to form the parts of the present invention are preferably rigid plastics such as polyvinyl chloride (PVC), acrylonitrile butadiene styrene (ABS), or any of a number of other rigid, structural plastics. When made of plastic, the respective parts of the invention can be conveniently injection molded, which does not require any subsequent cutting or forming operations. Additionally, the use of plastic materials permits the clamping members to be secured to the stake portion bY additional securing means, in addition to the connecting screws, such as by solvent sealing, gluing, or the like.

It will thus be seen that the present invention provides distinct advantages over the prior art structures, in that it provides a strong, rigid connection to securely hold a pipe below ground level in a predetermined position relative to the base of a trench. Additionally, because the various parts are movable relative to each other prior to final assembly, the device can be adapted to any particular installation. For example, the stake portion can be driven into a trench to any desired depth, and then one or more extension stake members of suitable length can be selected, depending on the diameter of the pipe to be supported and its elevation above the base of the trench. The clamping members can then be loosely positioned on the stake extension until the pipe is accurately aligned in the preferred axial alignment, whereupon the clamping members can be both adhesively secured to the stake portion, such as by solvent sealing, glue, or the like, and can also be firmly and mechanically connected to the stake member by means of the connecting screws. The outboard support rod can then be passed through the support rod throughbores in the clamping members, and a circlip can be inserted in an appropriate circumferential groove therein to prevent removal of the support rod from the clamping members. After the pipe has been properly aligned and the parts of the support have been secured in position, fill dirt can be pushed into the trench to surround and bury the pipe, which is then firmly supported from the undisturbed portion of the ground, so that it does not shift as a result of shifting of the loose fill dirt.

It is thus apparent that the present invention provides distinct advantages over the prior art approaches in that it provides a pipe support structure of wide application, which can be conveniently manufactured at low cost without the need for finishing operations, and from relatively inexpensive and readily available materials.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A pipe anchor for securely anchoring in the ground different diameter pipes, said anchor comprising:
   a. a stake body having a longitudinal axis and a non-circular cross section, the stake body including at least one laterally extending wing member to prevent stake movement after the stake body is driven into the ground;
   b. first and second clamping members each independently slidably carried on the stake body at axially spaced positions therealong to define a pipe-receiving gap between the clamping members, each clamping member movable toward and away from the other and having a stake-body-receiving opening corresponding substantially in cross section and size with the cross section and size of the stake body to permit the clamping members to be independently positioned at a desired axial position along the stake body, each clamping member having in a laterally extending edge thereof, relative to the stake body axis, a recess including a plurality of substantially circular arcs to permit the clamping members to engagingly receive within the recesses pipes having different diameters; and
   c. attachment means carried by each of the clamping members for securely attaching the clamping members in a desired axial position on the stake body.

2. A pipe anchor in accordance with claim 1, wherein the stake body includes at one end thereof an axially extending recess having a non-circular cross section.

3. A pipe anchor in accordance with claim 2, wherein the recess is of rectangular cross section.

4. A pipe anchor in accordance with claim 1, wherein the stake body includes rounded projections extending outwardly from each longitudinally extending exterior corner of the stake body.

5. A pipe anchor in accordance with claim 1, wherein the recesses in the clamping members are defined by concentric circular arcs corresponding in diameter with at least two different pipe diameters to permit at least two pipes having different pipe diameters to be separately clampingly received between the clamping members and in substantially surface contact with the recesses.

6. A pipe anchor in accordance with claim 1, wherein the recesses in the clamping members are defined by concentric circular arcs corresponding in diameter with at least four different pipe diameters.

7. A pipe anchor in accordance with claim 1, wherein the clamping members each include a passageway spaced from and substantially parallel with the throughbores to receive an outboard support rod adapted to prevent relative rotational movement of the clamping members about the stake body axis.

8. A pipe anchor in accordance with claim 7, wherein the support rod includes a stop member formed at one end thereof, and a plurality of axially spaced circular grooves adjacent an opposite end thereof, the grooves adapted to receive a circlip for limiting movement of the support rod relative to the clamping members.

9. A pipe anchor in accordance with claim 1, wherein the attachment means includes connecting screws extending through a portion of each of the clamping members and engagingly received by the stake body.

10. A pipe anchor in accordance with claim 2 including a stake body extension having a cross-sectional size and shape corresponding substantially with that of the stake body, and having at one end an axially extending, reduced area section adapted to be slidably received in the axial recess of the stake body to extend the length of the stake body and provide a pipe anchor having an increased axial length.

* * * * *